(12) United States Patent
Haun et al.

(10) Patent No.: US 7,843,163 B1
(45) Date of Patent: Nov. 30, 2010

(54) PORTABLE WEATHER RESISTANT ENCLOSURE

(75) Inventors: Darrell N. Haun, Sugar Land, TX (US); Donald N. Haun, Stafford, TX (US)

(73) Assignee: Solarcraft, Inc., Stafford, TX (US)

( * ) Notice: Subject to any disclaimer, the term of this patent is extended or adjusted under 35 U.S.C. 154(b) by 155 days.

(21) Appl. No.: 12/396,955

(22) Filed: Mar. 3, 2009

(51) Int. Cl.
*H01M 10/44* (2006.01)
*H02J 7/00* (2006.01)
*H02J 9/00* (2006.01)
*H01L 31/042* (2006.01)

(52) U.S. Cl. .................. 320/101; 320/138; 320/139; 307/64; 307/66; 136/244; 323/906; 220/826; 220/827; 220/849; 220/212

(58) Field of Classification Search .................. 320/101
See application file for complete search history.

(56) References Cited

U.S. PATENT DOCUMENTS

| 6,056,142 A | * | 5/2000 | Elliott | 220/278 |
| 7,578,414 B2 | * | 8/2009 | Sellars et al. | 221/65 |
| 2006/0266759 A1 | * | 11/2006 | Tramontina et al. | 221/33 |
| 2008/0067227 A1 | * | 3/2008 | Poss et al. | 232/17 |

* cited by examiner

*Primary Examiner*—Edward Tso
*Assistant Examiner*—Yalkew Fantu
(74) *Attorney, Agent, or Firm*—Buskop Law Group, PC; Wendy Buskop

(57) ABSTRACT

A portable weather resistant enclosure for supporting electronics in the field, having a body in sealable engagement with a door, a pedestal for elevating the enclosure above a surface, at least two lifting eyes for transporting the enclosure, the portable weather resistant enclosure being constructed to resist deformation during transport.

16 Claims, 4 Drawing Sheets

PORTABLE WEATHER RESISTANT ENCLOSURE

FIELD

The present embodiment generally relate to a tough resistant electronics supporting enclosure that is tough, weather resistant and liftable without deformation for use in the field, particularly in harsh environments such as the Arctic or Saudi Arabia.

BACKGROUND

A need exists for a sturdy enclosure for use with supporting solar arrays and with holding electronics in a weather resistant manner.

A further need exists for liftable enclosure that can be lifted by a crane to a barge or flatbed full loaded with electronics that will not deform or twist or subject the electronics to weather.

The present embodiments meet these needs.

BRIEF DESCRIPTION OF THE DRAWINGS

The detailed description will be better understood in conjunction with the accompanying drawings as follows.

Figure 1:
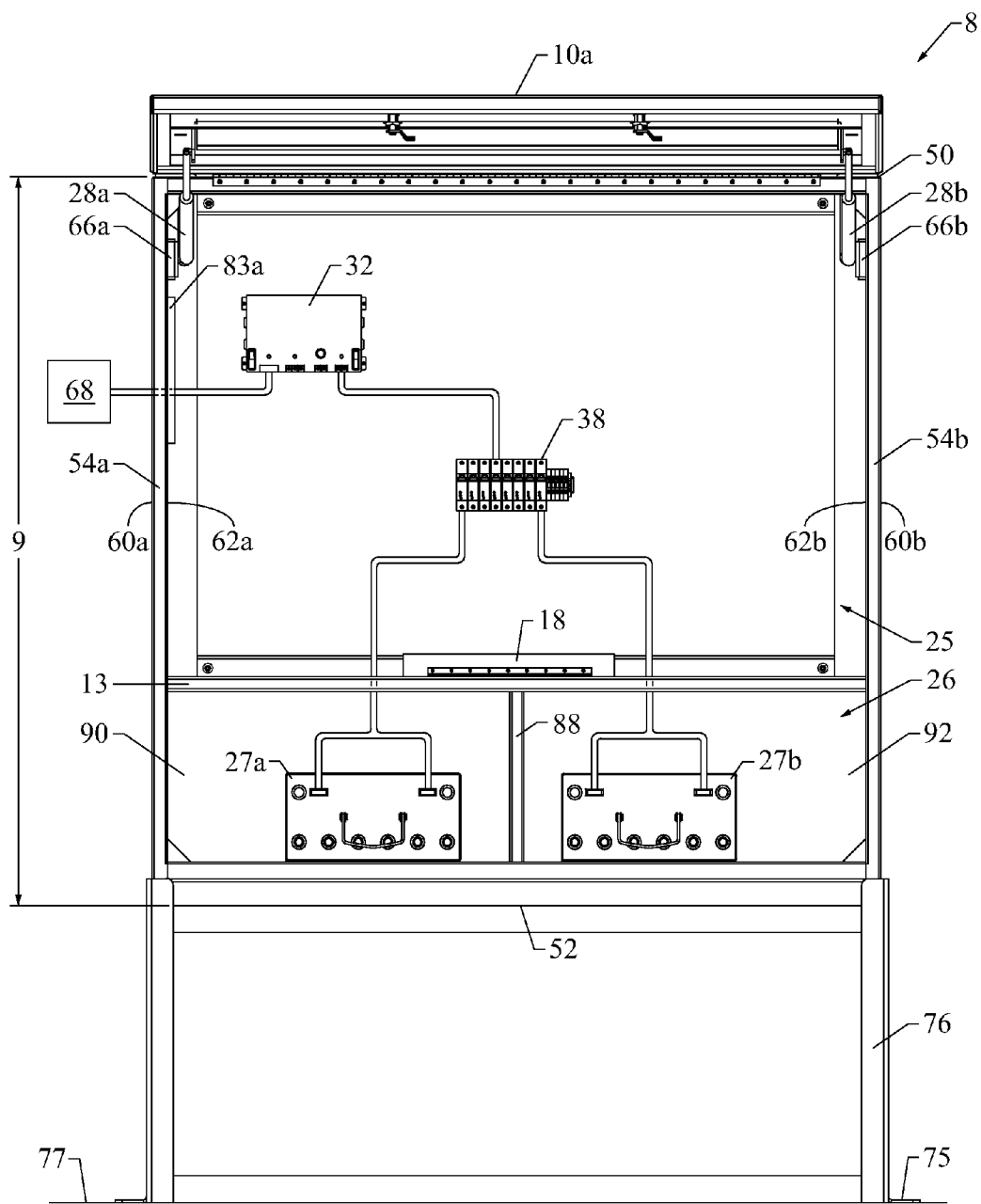
FIG. 1 illustrates a front view of one embodiment of an enclosure.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a portable weather resistant enclosure for supporting electronics which can include solar controllers, power chargers and battery systems.

The enclosure can be made from powder coated metal, such as aluminum that can be between about 1/16 inches to about 3/8 inches thick.

The enclosure can have a body and a movable door adapted to engage the body. The body can be generally a rectangular box with at least one movable door hinged to the body, and the movable door can overlap the walls of the box. The movable door, in one embodiment, can be removable from the body and can be attachable to the body with a plurality of fasteners, such as two fasteners. The fasteners can be attached to the body to hold the movable door.

In an embodiment, the body can be square or rectangular in shape. The body can have five walls, with each wall having an outer side and an inner side. One of the walls can form a base parallel to a surface on which the body can rest.

The body can be oval or circular in shape for a particular body. If oval or circular in shape, then only two or three walls would be used with one wall being the bottom or base.

In one embodiment, the body can be about 54 inches high, about 54 inches wide and about 28 inches deep. Various embodiments are envisioned for smaller or larger sizes depending on the equipment to be stored within the body.

The movable door, like the body, can be made of power coated aluminum having an aluminum thickness of between about 1/16 inches to about 3/8 inches.

The movable door can be the same height and width as the body, but can have an overhanging lip of up to several inches enabling the movable door to cover the open portion of the body and cover part of any wall that forms the portions of the body engaging the movable door.

A first seal, such as a rubber gasket can have a width of about 1 inch and a thickness of about 1/4 inches can be fastened such as with an adhesive, to the movable door to provide a weather tight sealing engagement with the body. The first seal can prevent water, steam, sand and other undesirable materials from getting inside the enclosure.

Various types of electronics can be positioned within the body either on a frame, or on a back plane which can be welded or secured to the base or secured to the interior of the body.

The electronics can include measurement equipment, telemetry equipment, flow control equipment, other equipment and combinations thereof.

In an embodiment, the electronics can be removably attached to the back plane. In an additional embodiment, the electronics can be removably attached to the frame. The enclosure can be designed so that parts of the electronics can be removed from the back plane or frame for repair if needed.

If a frame is used, the frame can be secured to the interior of the body, such as the bottom of the body or to a bulk head.

In another embodiment, a flange can be welded to one of the walls. The flange can encircle the walls, like a small frame on top of the body. The flange can be used to support first and second lifting eyes. The flange can also have lifting holes drilled in it for lifting of the portable weather resistant enclosure without the lifting eyes.

Insulation, such as an insulating material or insulating coating can be secured to the inside of each of the walls of the body or portions of some walls in the body. The overall size of the interior insulation can match the dimensions of the inner side of the walls of the body. The insulation can cover all or part of the walls, but at least about 50 percent can be contemplated as useful to reduce water build up inside the body.

A foldable tray having a size between about 10 inches to about 16 inches in length, about 6 inches to about 10 inches in width and a thickness suitable for supporting a portable device can be secured within the enclosure. The foldable tray can be mounted to a frame assembly, to a bulkhead, or to the bottom for supporting a computer, a lap top, or other computing device. The foldable tray can fold out from the frame assembly providing unique space saving and a place for resting a computer that can be used to run diagnostics and perform other functions on electronic components.

The movable door can be controlled using two pneumatic shocks, one, which can be connected on an inner side of a first wall, and the other, which can be connected to a second wall on the inner side opposite the first wall. Channel bars can be used to add strength to the walls and reinforce the power of the pneumatic shocks when used with the movable door. The channel bars can be welded or bolted to the walls and the shocks can be bolted or attached to the channel bars or directly to the interior of the walls.

Turning now to the figures, FIG. 1 shows an enclosure 8 including a body 9 resting on a pedestal 76. The body 9 is illustrated with a plurality of walls, including a top 50, a bottom 52 and side walls 54*a*, 54*b*. One of the walls 54*a* is illustrated with an inner side 62*a* and an outer side 60*a* and a second wall 54b is illustrated on the opposite side with an inner side 62b and an outer side 60b. Pedestal flanges 75 on the bottom of the pedestal 76 can provide a secure means for resting flush with a surface 77 and can be used to fasten the pedestal 76 to the surface 77. The modular design of the enclosure 8 can allow a crane to move and position the apparatus, and the pedestal flanges 75 can permit securing the apparatus at a single location.

FIG. 1 further illustrates a movable door 10a in an open position providing access to the components contained within the body 9. The movable door 10a can be controlled using two pneumatic shocks 28a, 28b. One pneumatic shock 28a can be connected on an inner side 62a of a first wall 54a through a channel bracket 66a, and one pneumatic shock 28b can be connected on an inner side 62b to a second wall 54b through a channel bracket 66b. In one embodiment, a single pneumatic shock can operate the movable door. The pneumatic shocks can also be mounted directly with the walls 54a, 54b.

A parallel stiff non-deformable bar 83a, can be seen in FIG. 1, which can provide structural support to the body 9, with at least a second parallel stiff non-deformable bar 83b, which is obstructed from view by the first parallel non-deformable bar 83a.

A bulkhead 13 can be disposed in the body 9 forming a top compartment 25 and a bottom compartment 26. A bulkhead support 88 can further divide the bottom compartment into a right compartment 90 and a left compartment 92.

A foldable tray 18 is illustrated mounted with the bulkhead 13. The foldable tray can be affixed by hinges in order to pivot between two positions. The foldable tray is illustrated in a storage position, but can pivot providing a flat surface for computers, lap tops or other portable devices.

A power charger can be contained within the body 9 for receiving an outside source of power. The power charger can be an uninterrupted power supply adapted to receive an AC current. The power charger can also be a solar controller for receiving power from a solar array. In either case, the power charger can receive power from a power source for the purpose of charging batteries 27a, 27b which can be located in the bottom compartment 26 below the bulkhead 13.

FIG. 1 further illustrates the power charger as an uninterruptable power supply 32 connected to a power source 68, which can be an external AC power source. The uninterruptable power supply can be connected to the batteries 27a, 27b through a low voltage distribution block 38.

Figure 2:
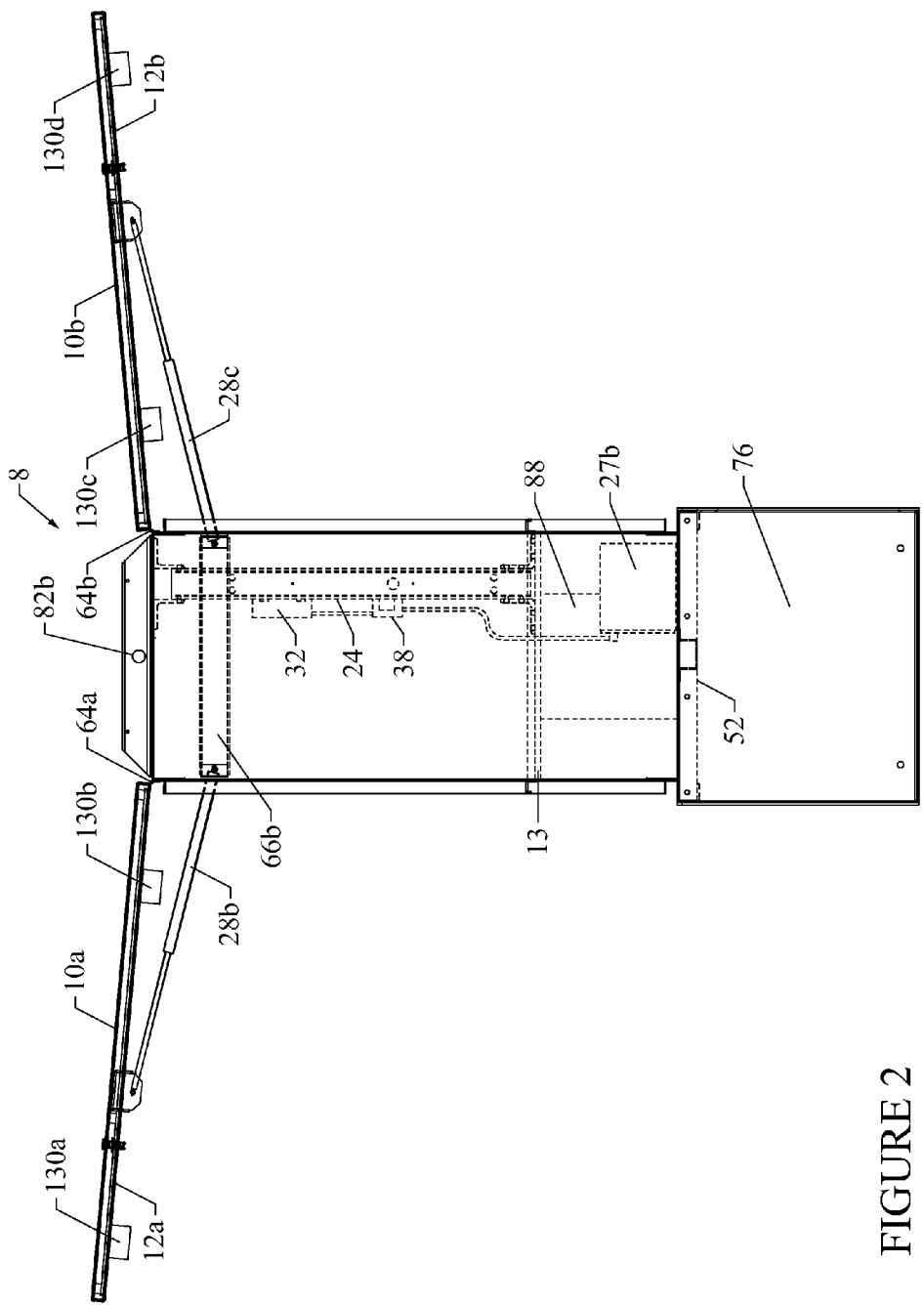
FIG. 2 illustrates a side view of one embodiment of an enclosure.

FIG. 2 depicts a side view of the enclosure 8 which can have two movable doors 10a, 10b pivotally mounted the body 9 by hinges 64a, 64b. Pneumatic shocks 28b, 28c are illustrated holding each movable door 10a, 10b in an open position. In one embodiment pneumatic shocks 28a, 28d, which are not visible in FIG. 2, can be located opposite pneumatic shocks 28b, 28c while in another embodiment each movable door can require a single pneumatic shock or multiple pneumatic shocks.

Seals 12a, 12b can be seen on the inner surface of the movable doors 10a, 10b for forming a sealing engagement between movable doors 10a, 10b and the body 9. The seals 12a, 12b can prevent rain, dirt and other elements from reaching the interior of the body 9. The elevated position on the body 9 on the pedestal 76 can further prevent debris and water for entering the body.

The movable doors 10a, 10b can also include lights 130a, 130b, 130c, 130d. The lights 130a, 130b, 130c, 130d can be configured within each movable door 10a, 10b to point generally downward, or to be slightly tilted towards the interior of the body 9. In this way the equipment stored in or operating in the enclosure 8 can be illuminated, improving a workers ability to work on the equipment or take readings from the equipment.

The lights 130a, 130b, 130c, 130d can be connected to the batteries 27a, 27b or to the uninterruptable power supply 32.

The pneumatic shocks 28b, 28c are illustrated connected to the body 9 through a channel bracket 66b. The channel bracket 66b can add support to the enclosure 8 and can further provide a mounting position for the pneumatic shocks.

Lifting eye 82b is illustrated and can be secured through flanges welded on the near side of the body 9.

The bulkhead support 88 can be seen and can be attached between the bottom 52 of the body 9 and the bulkhead 13, just above the pedestal 76.

The back plane 24 can be seen mounted to the bulkhead 13, and can support a power charger such as an uninterruptable power supply 32 for supplying power through a low voltage distribution block 38. The uninterruptable power supply 32 can be connected to the batteries 27a, 27b and other electronics equipment in the body 9.

Figure 3:
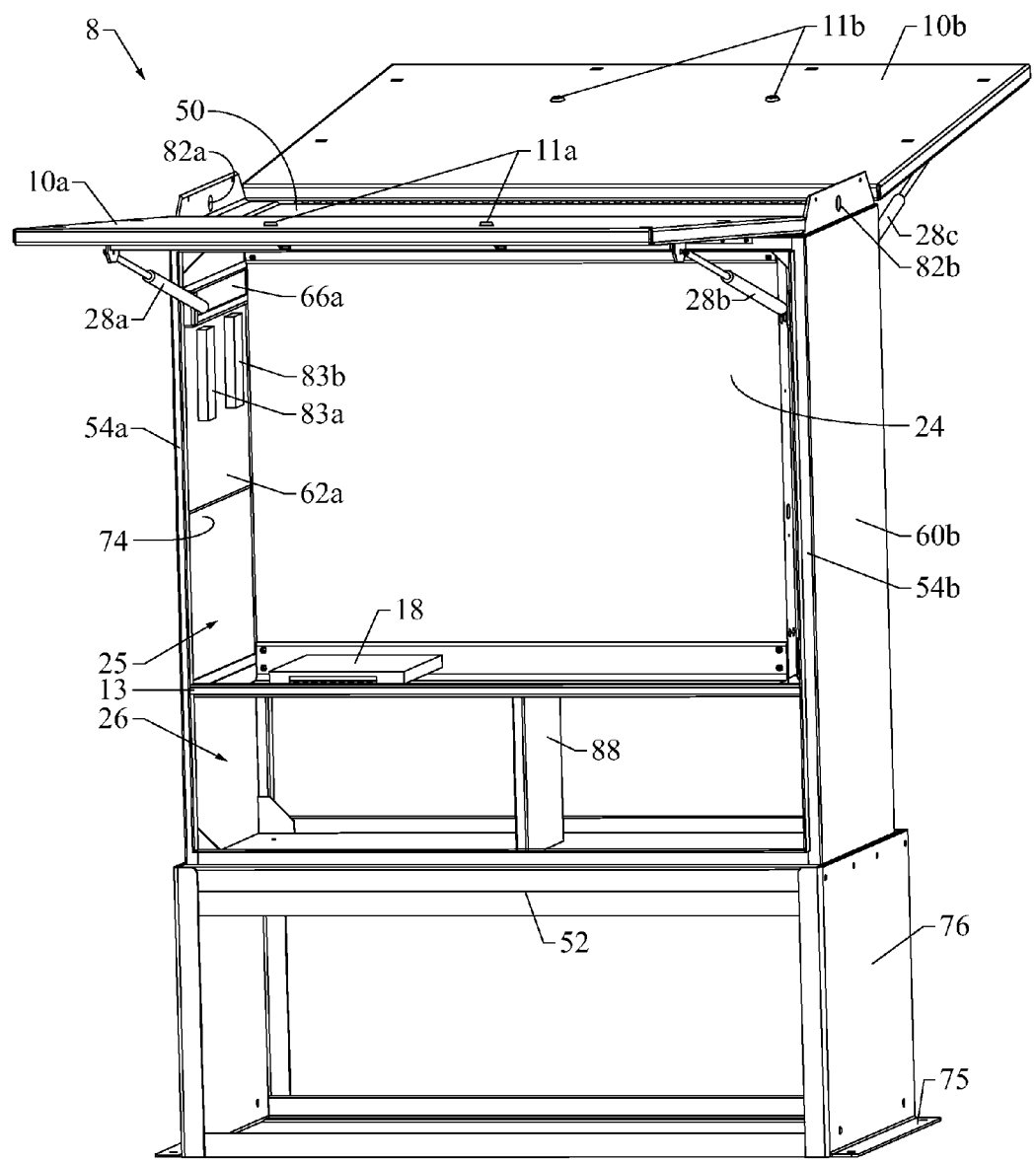
FIG. 3 illustrates a perspective view of one embodiment of an enclosure.

FIG. 3 illustrates a perspective view of the enclosure 8 including a body 9, which can be secured to a pedestal 76. Movable door fasteners 11a, 11b can be used for securing the movable door to the body. Both movable doors 10a, 10b are illustrated in the open position. The body 9 and movable doors 10a, 10b illustrated in FIG. 3 can include each of parts of the body previously illustrated in FIG. 1 and FIG. 2, but the power charger has been omitted from this view.

Parallel stiff non-deformable bars 83a, 83b can be seen in the view of FIG. 2, which can further provide structural support to the body 9. The parallel stiff non-deformable bars 83a, 83b can also be used as supports for mounting objects to the exterior of the body.

The foldable tray 18 can be seen secured to the bulkhead 13 within the body 9. The bulkhead support 88 can be seen attached between the bottom 52 of the body 9 and the bulkhead 13.

Insulation 74 can be seen cut way from the interior of the body 9. The interior of the body 9 can be completely or partially covered with insulation 74, including the interior side of each movable door 10a, 10b.

From this perspective view each of the lifting eyes 82a, 82b can be seen on generally opposite sides of the body providing a balanced means for lifting the enclosure.

Figure 4:
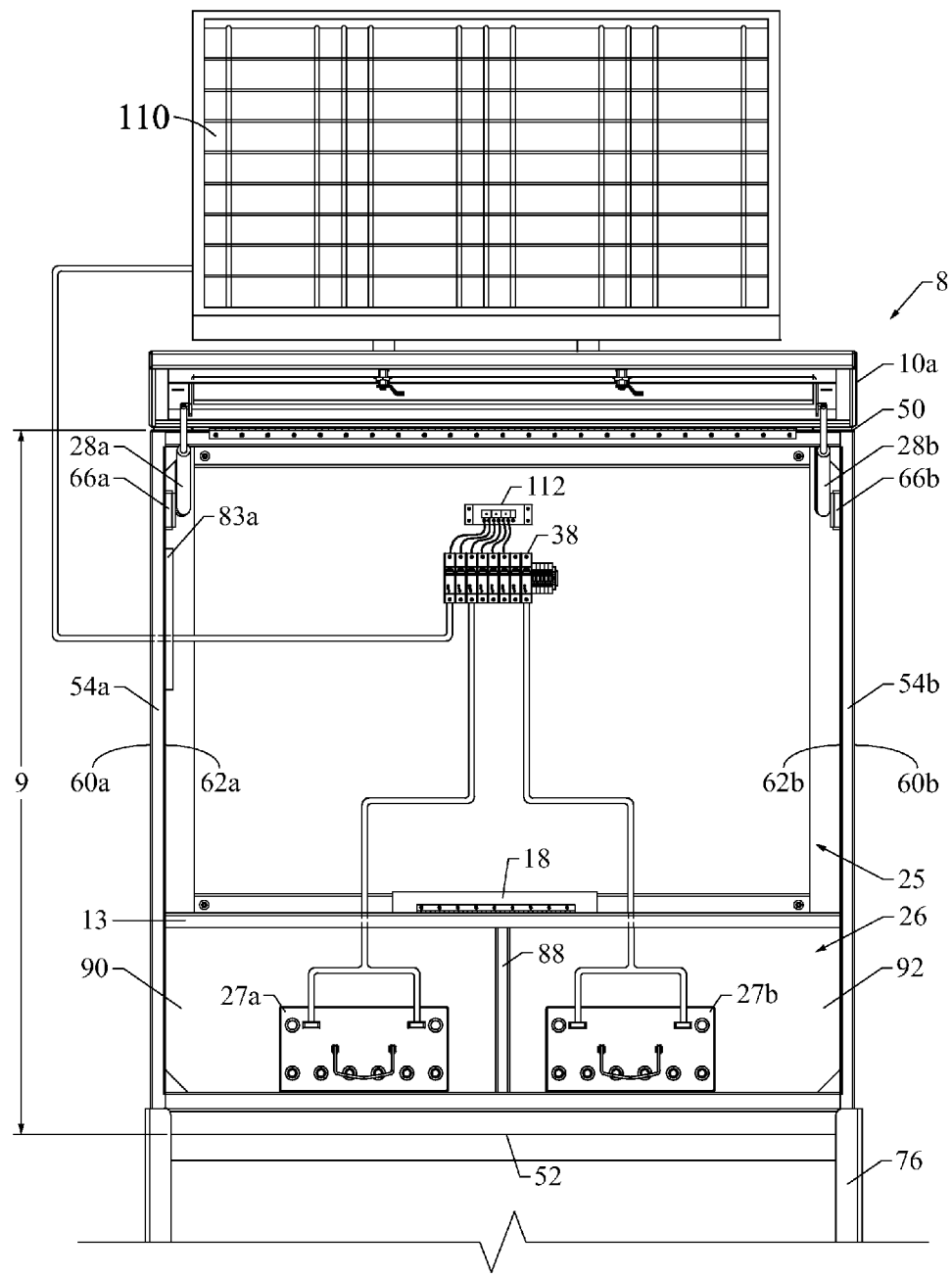
FIG. 4 illustrates an embodiment of an enclosure connected to a solar array.

FIG. 4 illustrates another embodiment, wherein the body 9 and movable doors 10a, 10b can contain the same parts as FIG. 1 and FIG. 2, but can further include a solar controller 112 which can be connected to a solar array 110 for power.

A solar controller 112 can be in communication with a low voltage distribution block 38, which can be mounted to the back plane 24. The low voltage distribution block 38 can receive power from a solar array 110 and can distribute power to the batteries 27a, 27b.

While these embodiments have been described with emphasis on the embodiments, it should be understood that within the scope of the appended claims, the embodiments might be practiced other than as specifically described herein.

What is claimed is:

1. A portable weather resistant enclosure comprising:
   a. a body comprising plurality of walls each wall having an outer side and an inner side;
   b. a movable door connected to the body;
   c. at least one movable door fastener for securing the movable door to the body;
   d. a seal disposed on the movable door for providing a weather tight sealing engagement with the body;
   e. a back plane removably secured to the body;

f. a bulkhead disposed between at least two walls forming a top compartment and a bottom compartment;
g. at least one battery disposed in the bottom compartment;
h. at least one power charger connected to a back plane in the top compartment;
i. a pedestal for maintaining the body above a surface;
j. a first lifting eye connected to one of the walls and a second lifting eye connected to one of the walls opposite the first lifting eye, wherein the lifting eyes enable a crane to lift the portable weather resistant enclosure without affecting the electronics or deforming the enclosure.

2. The enclosure of claim 1, wherein the support comprises two parallel stiff non-deformable bars fixedly secured to an inner side of one of the walls.

3. The enclosure of claim 1, further comprising insulation disposed on at least a portion of the inner sides of all the walls.

4. The enclosure of claim 1, further comprising a hinge for connecting the movable door to the body.

5. The enclosure of claim 1, further comprising a foldable tray mounted to at least one wall, wherein the foldable tray can be folded out for supporting a computer, a lap top, a portable device or combinations thereof.

6. The enclosure of claim 1, further comprising at least one pneumatic shock secured on a first end to a first wall of the body and on a second end to the movable door.

7. The enclosure of claim 6, further comprising at least one channel bracket disposed between the at least one pneumatic shock first end and the one of the walls, and at least a second channel bracket disposed between a second pneumatic shock first end and the second wall.

8. The enclosure of claim 1, further comprising lights mounted on the interior of the movable door.

9. A portable weather resistant enclosure comprising:
a. a body comprising plurality of walls each wall having an outer side and an inner side;
b. a movable door connected to the body;
c. at least one movable door fastener for securing the movable door to the body;
d. a seal disposed on the movable door for providing a weather tight sealing engagement with the body;
e. a back plane removably secured to the body;
f. a bulkhead disposed between at least two walls forming a top compartment and a bottom compartment;
g. at least one battery disposed in the bottom compartment;
h. at least one power charger connected to a back plane in the top compartment in communication with the at least one battery;
i. a solar array in communication with the power charger;
j. a pedestal for maintaining the body above a surface;
k. a first lifting eye connected to one of the walls and a second lifting eye connected to one of the walls opposite the first lifting eye, wherein the lifting eyes enable a crane to lift the portable weather resistant enclosure without affecting the electronics or deforming the enclosure.

10. The enclosure of claim 9, wherein the support comprises two parallel stiff non-deformable bars fixedly secured to an inner side of one of the walls.

11. The enclosure of claim 9, further comprising insulation disposed on at least a portion of the inner sides of all the walls.

12. The enclosure of claim 9, further comprising a hinge for connecting the movable door to one of the body.

13. The enclosure of claim 9, further comprising a foldable tray mounted to the at least one wall, wherein the foldable tray can be folded out for supporting a computer, a lap top, a portable device or combinations thereof.

14. The enclosure of claim 9, further comprising at least one pneumatic shock secured on a first end to a first wall of the body and on a second end to the movable door.

15. The enclosure of claim 14, further comprising at least one channel bracket disposed between the at least one pneumatic shock first end and the one of the walls, and at least a second channel bracket disposed between a second pneumatic shock first end and the second wall.

16. The enclosure of claim 9, further comprising lights mounted on the interior of the movable door.

* * * * *